United States Patent
Edwards et al.

(10) Patent No.: US 11,677,682 B1
(45) Date of Patent: *Jun. 13, 2023

(54) REACTIVE THROTTLE INFRASTRUCTURE

(71) Applicant: United Services Automobile Association (USAA), San Antonio, TX (US)

(72) Inventors: Jason Edwards, San Antonio, TX (US); Jami Renee Delgadillo, San Antonio, TX (US); Valeria Rodriguez Garza, Helotes, TX (US); Vamshi Mohan Gobburu, San Antonio, TX (US); Annat Rosenthal, San Antonio, TX (US); Britton Mims Ware, IV, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,404

(22) Filed: Sep. 2, 2021

Related U.S. Application Data (63) Continuation of application No. 16/359,706, filed on Mar. 20, 2019, now Pat. No. 11,121,983.

(51) Int. Cl.
*H04L 47/70* (2022.01)
*H04L 47/50* (2022.01)
*H04L 47/20* (2022.01)
*H04L 43/08* (2022.01)

(52) U.S. Cl.
CPC ............ *H04L 47/822* (2013.01); *H04L 43/08* (2013.01); *H04L 47/20* (2013.01); *H04L 47/50* (2013.01)

(58) Field of Classification Search
None
See application file for complete search history.

(56) References Cited

U.S. PATENT DOCUMENTS

| | | | |
|---|---|---|---|
| 2003/0169690 A1* | 9/2003 | Mott | ........................ H04L 47/10 370/238 |
| 2004/0037306 A1* | 2/2004 | Khan | ..................... H04W 28/10 370/437 |
| 2015/0046920 A1 | 2/2015 | Allen | |
| 2017/0213242 A1 | 7/2017 | Sundaram et al. | |
| 2019/0245943 A1 | 8/2019 | Dukhovny et al. | |
| 2020/0228462 A1 | 7/2020 | Bohra | |

OTHER PUBLICATIONS

Sajai Soni. "Deferring Tasks in Laravel Using Queues" published Dec. 18, 2017. (Year: 2017).

* cited by examiner

*Primary Examiner* — Scott B Christensen
(74) *Attorney, Agent, or Firm* — BakerHostetler (57) ABSTRACT

Systems and methods provide a reactive throttle architecture for managing traffic to shared resources. Such systems and methods define a throttling policy based at least in part on traffic to a resource. The traffic to the resources is directed through one or more logical lanes. A request from a client to access the resource is received, and a permit can be issued to the client to use one or more logical lanes to access the resource in accordance with the throttling policy.

20 Claims, 10 Drawing Sheets

REACTIVE THROTTLE INFRASTRUCTURE

TECHNICAL FIELD

The subject matter of this disclosure generally relates to managing access to shared resources, and more particularly to a reactive throttle infrastructure for throttling access control.

CROSS-REFERENCE TO RELATED APPLICATIONS

This patent application claims priority to and the benefit of U.S. Ser. No. 16/359,706 filed Mar. 20, 2019, which is incorporated herein by reference in its entirety.

BACKGROUND

Various enterprises manage access to resources or pools of resources within their networks and electronic systems by throttling access. The underlying reasoning is that a system defined by a chain of components (e.g., multiple clients and servers) is only as fast as its slowest component, and tasking the system faster than its slowest component will result in degraded performance or queues of increasing length.

Throttling without feedback can result in arbitrarily slow responses and ineffective resource management. To more efficiently utilize available resources in view of changing demands, some enterprises have introduced feedback-based throttling that can change throttling policy or resource availability based on the performance of the components in the chain. However, to implement such solutions, software must be made compatible and provide its performance data (e.g., a "backpressure signal") to specialized feedback-based throttling software. In established enterprises, retrofitting existing software to add such functionality can be expensive or require replacement of certain software packages.

There is accordingly a need for throttling solutions that do not result in expensive and lengthy overhauling of enterprise systems.

SUMMARY

In an embodiment, a system comprises a policy subsystem configured to define a throttling policy based on traffic for each of a plurality of logical lanes associated with a resource; an interface subsystem configured to receive a request from a client to access the resource, wherein the client accesses the resource through multiple ones of a plurality of logical lane configured to accept requests from a different class of clients including the client such that different service requests are allocated to different lanes based on the service type of the service request in accordance with the class of client associated with the service; and an implementation subsystem configured to throttle traffic from the client to the resource based on the throttling policy, wherein the throttling policy controls a permit issued to the client for the one of the plurality of logical lanes based on one or more queue limits associated with one or more of the plurality of logical lanes.

In an embodiment, a method comprises defining a throttling policy based on traffic for each of a plurality of logical lanes associated with a resource, the plurality of logical lanes configured to accept requests from a different class of clients including the client such that different service requests are allocated to different lanes based on the service type of the service request in accordance with the class of client associated with the service; receiving a request from a client to run a task utilizing a network resource, wherein the client accesses the resource to run the task through multiple ones of the plurality of logical lanes; and throttling traffic from the client to the resource based on the throttling policy, wherein the throttling policy controls a permit issued to the client for the one of the plurality of logical lanes based on one or more queue limits associated with one or more of the plurality of logical lanes.

In an embodiment, a computer program product stored on a non-transitory computer-readable medium containing instructions that when executed by a processor effectuate operations comprising: defining a throttling policy based on traffic for each of a plurality of logical lanes associated with a resource, the plurality of logical lanes configured to accept requests from a different class of clients including the client such that different service requests are allocated to different lanes based on the service type of the service request in accordance with the class of client associated with the service; receiving a request from a client to run a task utilizing a network resource, wherein the client accesses the resource to run the task through multiple ones of the plurality of logical lanes; and throttling traffic from the client to the resource based on the throttling policy, wherein the throttling policy controls a permit issued to the client for the one of the plurality of logical lanes based on one or more queue limits associated with one or more of the plurality of logical lanes.

Additional and alternative aspects will be apparent on review of other portions of this disclosure.

BRIEF DESCRIPTION

So that those having ordinary skill in the art, to which the present disclosure pertains, will more readily understand how to employ the novel system and methods of the present disclosure, certain illustrated embodiments thereof will be described in detail herein-below with reference to the drawings, wherein.

DETAILED DESCRIPTION

Aspects herein generally relate to a reactive throttling infrastructure capable of throttling calls or requests to shared resources in a manner that allows for dynamic load management in legacy environments and without modifying legacy software or components. A throttling infrastructure can manage a pool and dynamically adjust a pool size to ramp until the resources to which it controls access begin to slow in response, at which point the throttle can reduce an amount of traffic received in a time period with a novel permitting technique.

Implementation of this system avoids reprogramming costs associated with configuring legacy systems to provide backpressure signals, and can provide efficiencies in the managed resources by reducing the number of duplicates or silos are required to service an enterprise through efficient management.

Figure 1:
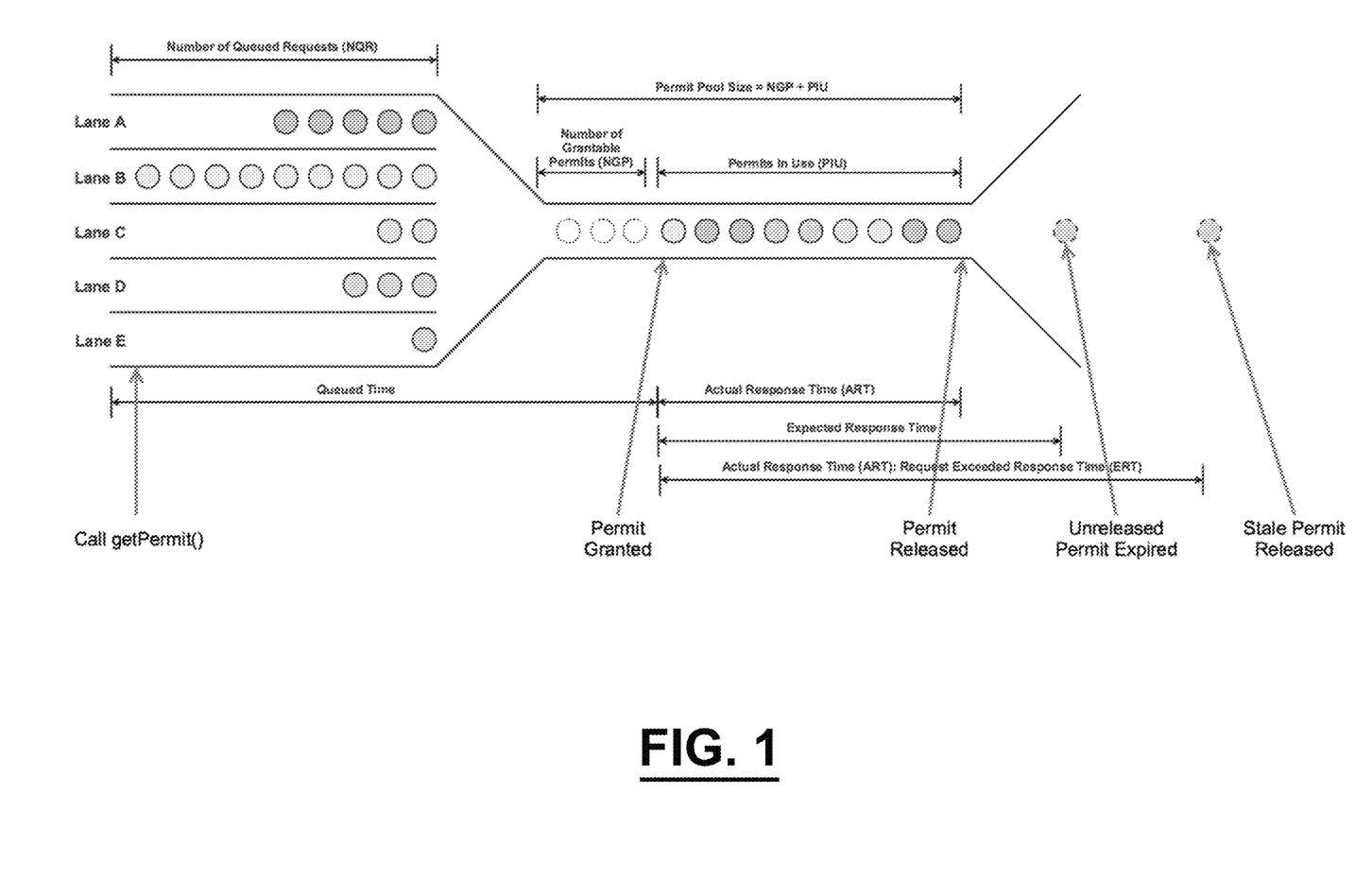
FIG. 1 illustrates a diagram of an example implementation of the disclosure.

FIG. 1 illustrates the framework for the reactive throttle infrastructure disclosed and assists with definition of several terms. At left, a variety of "lanes" are defined for requests to access resources. Each lane can be associated with a particular resource (e.g., database, service, application, virtual machine, compute, network, storage, backend); multiple lanes can be associated with a particular resource, with lanes differentiated by priority, clients allowed access, permit parameters (e.g., expiration time, policy), and so forth; multiple resources can be associated with a particular lane (e.g., one lane for receiving permits to two or more services); or combinations of such lane schemes can be utilized in a single embodiment. The lanes represent the channels through which clients request access to or use of a resource, and represent the requests as circles, which can be queued ("Number of Queued Requests"), granted permits, or rejected in response to those requests ("getPermit" in FIG. 1). Queue limits or maximum sizes can be the same or different between each lane, and can change dynamically based on policy, as can the criteria for granting permits to requests to each lane.

To the right of the lanes is a permit pool where granted and in-use permits are represented. A certain number of permits from each lane can be provided in a pool. Permits are granted for client requests to access or use resources and are either immediately entered into the pool or queued for entry into a pool when a permit from the client's lane is released. The pool can include dedicated permits (or a total number of permits in use or grantable) for particular lanes (e.g., four permits reserved for Lane A, two permits for Lane B, and one permit apiece for Lanes C, D, and E); shared permits (e.g., permits which may be granted and used by two or more lanes); unrestricted permits (e.g., permits which may be granted to and used by any lane); and combinations thereof.

Permits granted and entering the in-use permit pool, via the sub-pool of grantable permits (permits in the permit pool not in use through, e.g., release and destruction of a permit previously in use, through an increase in pool size) each have a timeout, after which the permit expires and becomes stale. The permit is provided time to complete the job while in the permit pool. If the job is completed, the permit is released. If the job is not completed before the expiration of the timeout, the permit expires and is released simultaneously or after a subsequent suspense period.

While the jobs proceed to completion or expiration, a number of metrics are collected. The number of queued requests, which can be the total for the pool or by-lane, can be tracked. If this number becomes too high, one or more lanes may begin rejecting requests (e.g., declining to queue a request for which no permit is available and returning an error), the pool size may be increased (if the pool size can be increased without unreasonably degrading performance), permit policy can be changed, lane priority can be changed, and/or timeouts can be varied. The queue time (e.g., the time between a request being submitted and the time until the request is granted a permit and enters into use of the permit) is similarly tracked. Queue size, permit policy, lane priority, pool size, and/or timeout can be varied. Performance degradation involves Quality of Service falling below thresholds or requirements for one or more lanes, which can involve too many rejected requests, excess actual response time, and others.

The expected response time can describe the statistical target for completion of tasks in the permit pool, and can define (at least in part) a timeout period. The expected response time can be dynamic and based on measured or expected performance, and/or may be based on Quality of Service or other parameters. The actual response time is the time until a task associated with a permit is actually completed. Where the actual response time exceeds the expected response time (e.g., by a static threshold, by a dynamic threshold that varies based on performance, in any amount), the permit expires. Expired permits are stale and released immediately or following a subsequent (static or dynamic) threshold. Once a permit is released (e.g., either by job completion or expiration), the permit is destroyed, and a new grantable permit in the pool is created.

If system performance falls below Quality of Service levels due to actual response times consistently exceeding expected response times (or other time thresholds), the size of the permit pool can be reduced (with respect to all permits or permits from particular lanes or for accessing particular resources) to reduce resource requirements and allow larger resource allocations for the permits in process. If the pool size causes the number of queued requests or time to exceed Quality of Service thresholds, the pool size can be increased, or the maximum queue length can be decreased and job requests rejected until the permit pool, using the resources associated, reduce the queue length.

Describing an example, the permit pool of FIG. 1 can describe access to one or more resources by Lanes A, B, C, D, and E, each associated with a different class of client. Lanes C, D, and E can each be associated with classes of clients with lower priority and/or less time sensitivity, and can be granted permits at a baseline rate (e.g., less than ten percent of permits). Lane B can have a standard priority and/or standard time sensitivity, and can be granted permits at a rate above the baseline (e.g., fifteen to twenty percent of permits). Lane A can have a high priority or high time sensitivity, and can be granted permits at a rate higher above the baseline (e.g., thirty to forty percent of permits). For example, Lane A may relate to code provisioning for real-time two-factor authentication; Lane B may relate to an e-mail service; and Lanes C, D, and E can be related to network backups, logging, scheduling, et cetera. Permits are queued, and as the number of grantable permits increases through release of permits (either by job completion or expiration), grantable permits become available. Based on the lane priorities and queue lengths, permits are pledged to queued jobs, and granted into the permits in use pool when a grantable permit is provided to the respective lane.

Continuing in the example, Lane B may exceed its maximum queue, whereby the queued time would exceed a Quality of Service or permitting timeout if additional jobs were queued. Accordingly, requests from Lane B can be rejected until the queue length is reduced. Lane A, a high-priority lane requiring real-time handling, may see its queue increase to exceed its maximum queue time. In response, to continue servicing of all requests, the permit pool size may be increased, and/or a larger proportion of the permit pool may be allocated to Lane A (with collateral effects on other lanes) to maintain the required Quality of Service for Lane A. Alternatively, if no additional resources are available for expanding the pool size and if the collateral effects of reducing a number of permits to other lanes would compromise Quality of Service for multiple lanes, jobs could be rejected from Lane A, allowing real-time customers to re-request.

Based on the actual response time and Quality of Service, queued times and expected response times can be adjusted to improve permitting and task handling speed, increase job completion rates, and/or accommodate particular queue and/or pool sizes. These and other variables can be handled dynamically according to queuing. To target desired expected response times or control actual response times, pool sizes can increase, lane priority can change, queue size can change, et cetera. Moreover, when throughput is satisfying or exceeding Quality of Service for all lanes, pool size can be decreased (or other policy changes made) to reduce demand, reduce power consumption, increase resources dedicated to a fewer number of tasks, et cetera.

Figure 2:
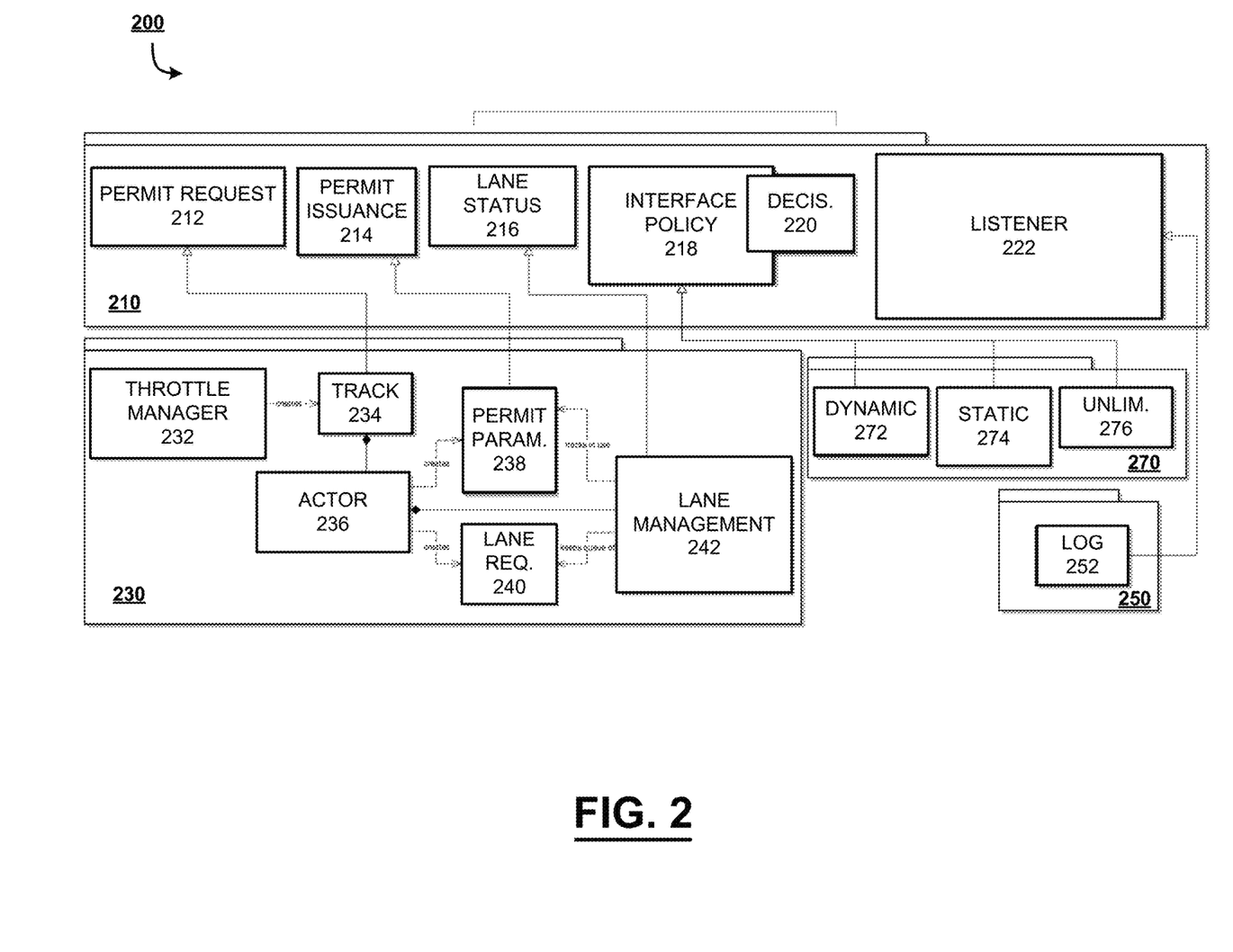
FIG. 2 illustrates a block diagram of an example system of the disclosure.

FIG. 2 illustrates an example embodiment of a system 200 for implementing the framework of FIG. 1. System 200 includes an interface subsystem 210, an implementation subsystem 230, a monitor subsystem 250, and a policy subsystem 270.

Interface subsystem 210 is configured to communicate with a client operatively coupled with a resource. Interface subsystem 210 can be implemented as one or more application programming interfaces (APIs) with which client devices can interact. Interface subsystem 210 can include permit request module 212. Permit request module 212 is configured to receive a request for a permit from a client. The request and associated lane information is provided to the throttling system and, if granted, the client receives an indication of a present or future permit pledged to the client, either by granting or through the request's placement in a queue.

Interface subsystem 210 can include permit issuance module 214. Permit issuance module 214 releases a permit from the permit pool, which can be a permit allocated to the lane within the permit pool, to the client. In embodiments, before releasing a permit, permit issuance module 214 confirms that the permit is grantable (e.g., permit granting conditions met and permit within pool available based on release of a permit, which may be required to be a permit within the lane of the request).

Interface subsystem 210 can include lane status module 216. Lane status module 216 can determine and communicate the status of a lane, including how many permits the lane has in use and how many requests the lane has in its queue.

Interface subsystem 210 can include interface policy module 218 and decision module 220. In embodiments, decision module 220 can be a sub-module of interface policy module 218. In other embodiments, decision module 220 can be independently implemented. Interface policy module 218 queries a number of grantable permits by lane (which can, but need not, involve submitting requests to implementation subsystem 230). This number can be determined by expected and actual response times, system health and performance information from listener module 222, and/or the status of previous permits, permits in use, and lane queues, based on policies from policy subsystem 270. Based on the grantable permits and lane policies, decision module 220 returns an instruction to grant, queue, or reject each respective request. Granted requests are issued a permit to be released; queued requests are added to a queue for their respective land; and rejected permits are refused and a message to such effect returned to the client.

Interface subsystem 210 can include listener module 222. Listener module 222 can initialize, for a client, the throttle, and monitor and return the state of the throttling system and resources managed through throttling. Listener module can observe the states of, e.g., queued requests, rejected requests, permits granted, permits released by job completion, permits expired, permits released for becoming stale after expiration, and other metrics described herein. This information can be received from, e.g., monitor subsystem 250, and logs associated with logging module 252, to allow access to relevant data on initialization.

Turning to implementation subsystem 230, this subsystem is configured to throttle traffic from the client to the resource based on a throttling policy. In embodiments, implementation subsystem 230 can be implemented in Java or JavaScript, including with Akka. Alternatively implementation subsystem 230 can be implemented using other languages, frameworks, or technologies. Implementation subsystem 230 can include throttle manager module 232. Throttle manager module is configured to communicate between interface subsystem 210 (and, by proxy, the client) and the throttle, and, in embodiments, the resources to which the throttle controls access.

Implementation subsystem 230 can include tracking module 234. Tracking module 234 is configured to track lanes and lane policies in view of requests from clients. Tracking module 234 can communicate with permit request module 212 as the implementation subsystem 230 counterpart. Tracking module 234 interacts with actor module 236. Actor module 236 is configured to maintain a current state of the throttling framework and throttled traffic, including mapping lanes, confirming the currency and correctness of policies, and receiving state data from listener module 222 (or other listeners associated with other throttles to different resources or for different groups of clients). As the implementation subsystem 230 can support multiple throttles for multiple resources or groups of lanes, one actor module 236 can be provided for each throttle. In embodiments, each throttle can correspond to a particular resource.

Implementation subsystem 230 can include lane request module 240. Lane request module 240 is configured to receive and handle requests not immediately grantable by queuing the requests. Where permits are immediately grantable, permit parameter module 238 grants the permit to the request for a particular lane at a given time, assigning its expiration time simultaneously (which can be static or dynamic based on policies or system configuration). Permit parameter module 238 can be the implementation subsystem 230 counterpart to permit issuance module 214.

Implementation subsystem 230 can include lane management module 242. Lane management module 242 is the implementation subsystem 230 counterpart to lane status module 216, and can determine the wait time for a queue, determine the number of permits in use not only by lane but also by client or resource identity, determine a number of queued requests, determine a number of permits in use, determine a number of expired permits, and make implementation-side determinations to queue a request, remove a request from a queue, add a permit released to a client to a permit in use list, and remove a permit released from a client from the permit in use list.

Turning to monitor subsystem 250 this subsystem is configured to monitor resource performance. Monitor subsystem 250 can include logging module 252. Logging module 252 can log the performance of the resources to which the system 200 throttles access, including the performance and time of tasks lodged to said resources.

Turning to policy subsystem 270, this subsystem is configured to define the throttling policy based on a performance of the resource and a lane of the client. Policy subsystem 270 can include dynamic policy module 272, static policy module 274, and unlimited policy module 276. Dynamic policy module 272 and static policy module 274 can vary the pool size or distribution of permits between lanes based on any of the variables discussed herein, aggregates thereof, statistics based thereon, et cetera, including, e.g., the current pool size, the expected response time (for a task in a particular lane, for all tasks, et cetera), queue lengths (which may be directly or indirectly captured by expected response time), and others. With static policy module 274, the policies remain the same, and a maximum pool size is specified which is not exceeded by policy.

Using dynamic policy module 272, the policy itself can also change based on the performance of system 200, its requested tasks, and the resources to which it throttles access. Dynamic policy module 272 need not have a maximum pool size, as it can exceed an arbitrary amount and will self-correct if performance suffers from an oversized pool. In embodiments, machine learning can be applied to historic performance information to define and refine dynamic policies and recognize request and performance patterns for which dynamic policies should shift. Dynamic policy module 272 can use an algorithm to regularly or continuously add or remove permits from the permit pool and change the composition of the permit pool (e.g., lane allocations and policy) by increasing demand on the resources (through larger pools or shorter expected response time) until performance degrades, then decreasing demand until it is resolved. While a steady state can be pursued, information gleaned from monitor subsystem 250 can be used to make continuous adjustments.

Unlimited policy module 276 is utilized for clients or software where no throttling occurs, and permits are granted for each request immediately. Policy subsystem 270 and modules therein can interact with and be counterpart to interface policy module 218.

While different modules of system 200 are described as residing in different subsystems or possessing various distributed functionality or roles, it is understood such can be combined, rearranged, merged, et cetera, in other manners without departing from the scope or spirit of the disclosure.

Figure 3:
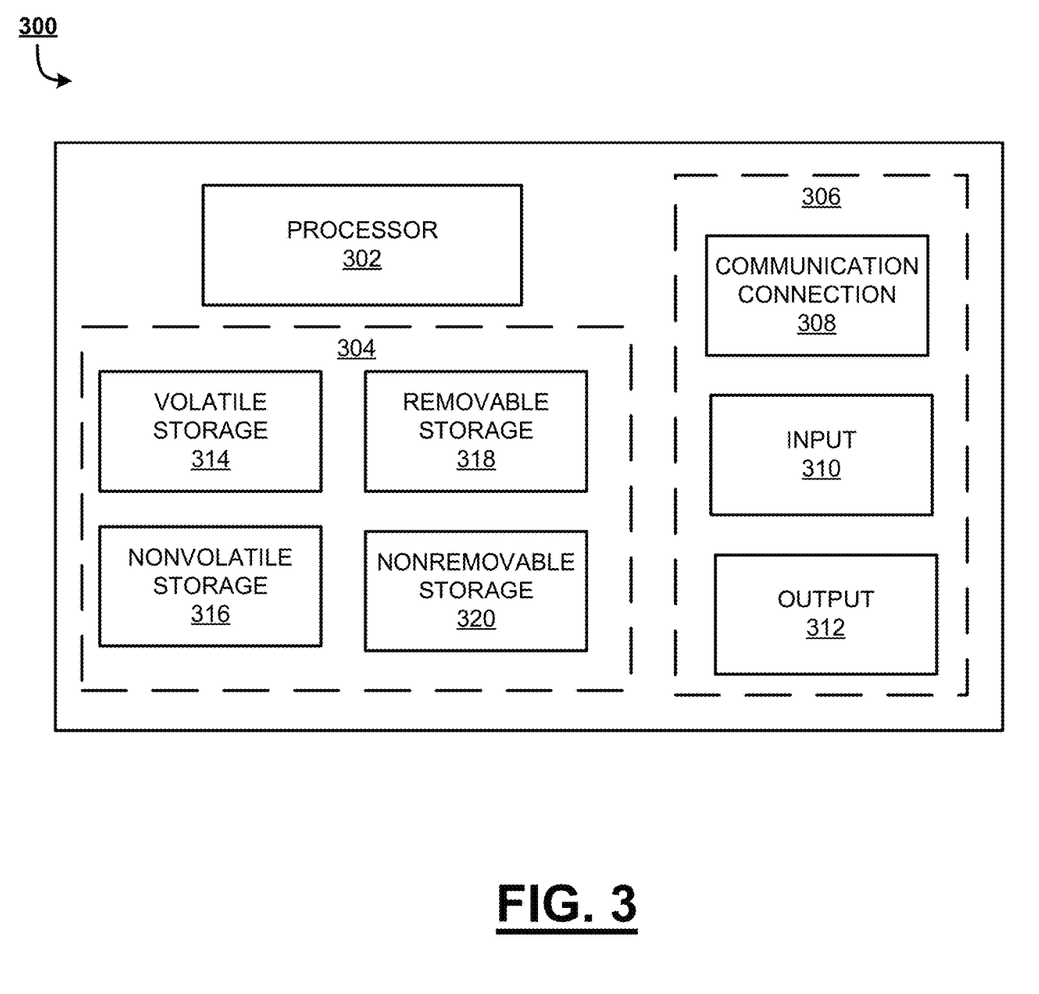
FIG. 3 is a block diagram illustrating an example implementation of a device which can be utilized in conjunction with or comprise a portion of systems disclosed.

FIG. 3 illustrates a device 300. Device 300 may comprise all or a part of modules or components herein. Device 300 may comprise hardware or a combination of hardware and software. The functionality to facilitate telecommunications via a telecommunications network may reside in one or combinations of links, portals, or connections. Device 300 depicted in FIG. 3 may represent or perform functionality of an appropriate device 300, or combination of modules or components herein. It is emphasized that the block diagram depicted in FIG. 3 is an example and not intended to imply a limitation to a specific implementation or configuration. Thus, device 300 may be implemented in a single device or multiple devices. Multiple network entities may be distributed or centrally located. Multiple network entities may communicate wirelessly, via hard wire, or any appropriate combination thereof.

Device 300 may comprise a processor 302 and a memory 304 coupled to processor 302. Memory 304 may contain executable instructions that, when executed by processor 302, cause processor 302 to effectuate operations associated with aspects disclosed herein. As evident from the description herein, device 300 is not to be construed as software per se.

In addition to processor 302 and memory 304, device 300 may include an input/output system 306. Processor 302, memory 304, and input/output system 306 may be coupled together (coupling not shown in FIG. 3) to allow communications there between. Each portion of device 300 may comprise circuitry for performing functions associated with each respective portion. Thus, each portion may comprise hardware, or a combination of hardware and software. Accordingly, each portion of device 300 is not to be construed as software per se. Input/output system 306 may be capable of receiving or providing information from or to a communications device or other network entities configured for telecommunications. For example input/output system 306 may include a wireless communications (e.g., WiFi/2.5G/3G/4G/GPS) card. Input/output system 306 may be capable of receiving or sending video information, audio information, control information, image information, data, or any combination thereof. Input/output system 306 may be capable of transferring information with device 300. In various configurations, input/output system 306 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 306 may comprise a WiFi finder, a two-way GPS chipset or equivalent, or the like, or a combination thereof.

Input/output system 306 of device 300 also may contain communication connection 308 that allows device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with aspects described herein. For example, processor 302 may be capable of, in conjunction with any other portion of device 300, managing social media communications as described herein.

Memory 304 of device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 300. Memory 304 may comprise executable instructions that, when executed by processor 302, cause processor 302 to effectuate operations for, e.g., listening to social media activity.

Figure 4:
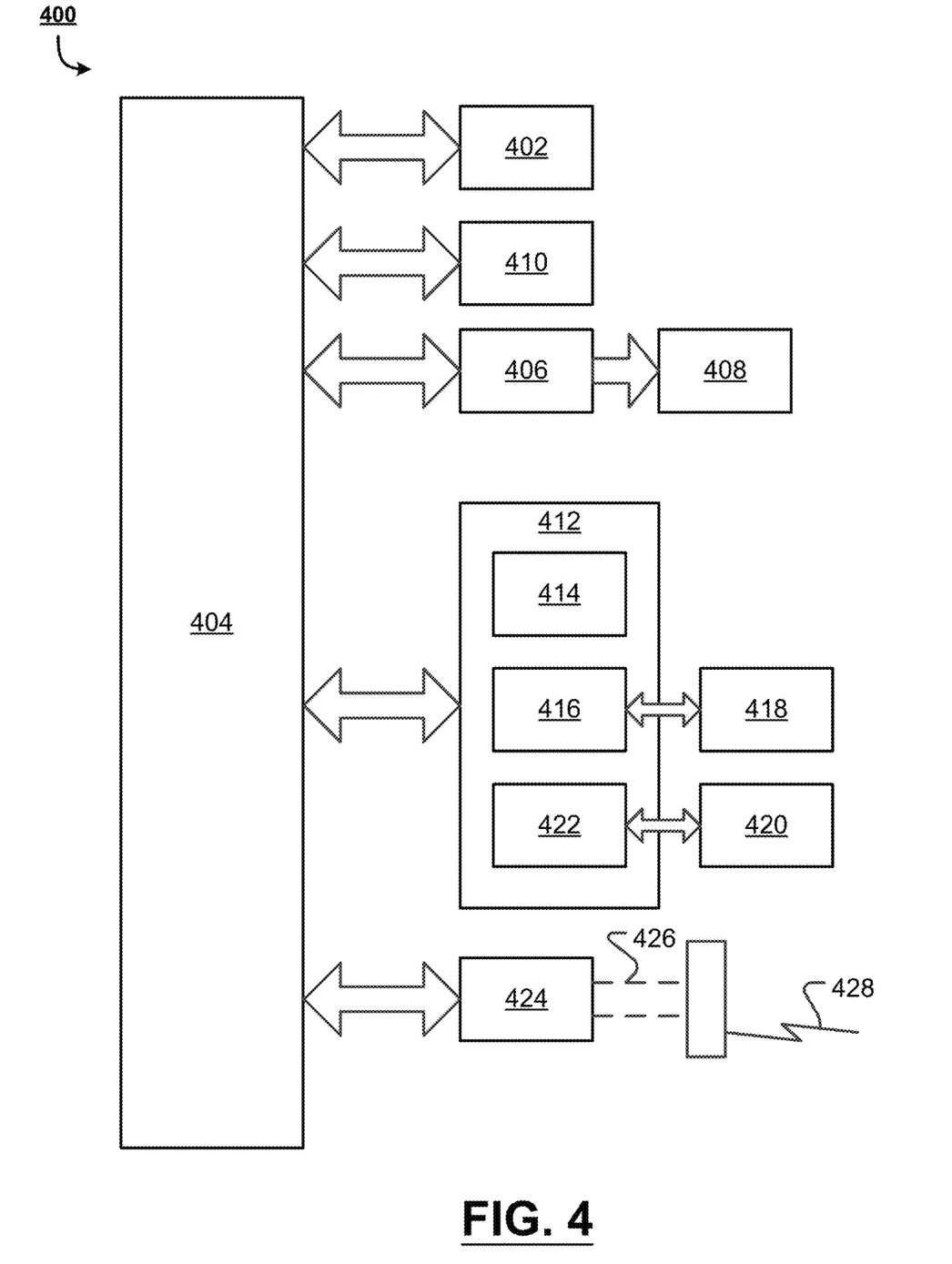
FIG. 4 is a block diagram of a computer system that be used to implement at least a portion of aspects herein.

FIG. 4 illustrates a computer-based system 400 that may constitute or include parts of one or more of aspects of, e.g., FIGS. 1 and/or 2, or device 300. Computer-based system 400 includes at least one processor, such as a processor 402. Processor 402 may be connected to a communication infrastructure 404, for example, a communications bus, a crossover bar, a network, or the like. Various software aspects are described in terms of this example computer-based system 400. Upon perusal of the present description, it will become apparent to a person skilled in the relevant art(s) how to implement the present disclosure using other computer systems or architectures.

Computer-based system 400 includes a display interface 406 that forwards graphics, text, or other data from communication infrastructure 404 or from a frame buffer (not shown) for display on a display unit 408.

Computer-based system 400 further includes a main memory 410, such as random access memory (RAM), and may also include a secondary memory 412. Secondary memory 412 may further include, for example, a hard disk drive 414 or a removable storage drive 416, representing a floppy disk drive, a magnetic tape drive, an optical disk drive, etc. Removable storage drive 416 reads from or writes to a removable storage unit 418 in a well-known manner. Removable storage unit 418 may represent a floppy disk, magnetic tape, or an optical disk, and may be read by and written to by removable storage drive 416. As will be appreciated, removable storage unit 418 includes a computer usable storage medium having computer software or data stored therein.

In accordance with various aspects of the present disclosure, secondary memory 412 may include other similar devices for allowing computer programs or other instructions to be loaded into computer-based system 400. Such devices may include, for example, a removable storage unit 420 and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 420 to computer-based system 400.

Computer-based system 400 may further include communication interface 424. Communication interface 424 may allow software or data to be transferred between computer-based system 400 and external devices. Examples of communication interface 424 include, but may not be limited to a modem, a network interface (such as an Ethernet card), a communications port, a Personal Computer Memory Card International Association (PCMCIA) slot and card, or the like. Software or data transferred via communication interface 424 may be in the form of a number of signals, hereinafter referred to as signals 426, which may be electronic, electromagnetic, optical or other signals capable of being received by communication interface 424. Signals 426 may be provided to communication interface 424 via a communication path (e.g., channel) 428. Communication path 428 carries signals 426 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 416, a hard disk installed in hard disk drive 414, or the like. These computer program products provide software to computer-based system 400. The present disclosure is directed to such computer program products.

Computer programs (also referred to as computer control logic) may be stored in main memory 410 or secondary memory 412. The computer programs may also be received via communication interface 404. Such computer programs, when executed, enable computer-based system 400 to perform the functions consistent with the present disclosure, as discussed herein. In particular, the computer programs, when executed, enable processor 402 to perform the features of the present disclosure. Accordingly, such computer programs represent controllers of computer-based system 400.

In accordance with an aspect of the present disclosure, where the disclosure is implemented using a software, the software may be stored in a computer program product and loaded into computer-based system 400 using removable storage drive 416, hard disk drive 414, or communication interface 424. The control logic (software), when executed by processor 402, causes processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Figure 5:
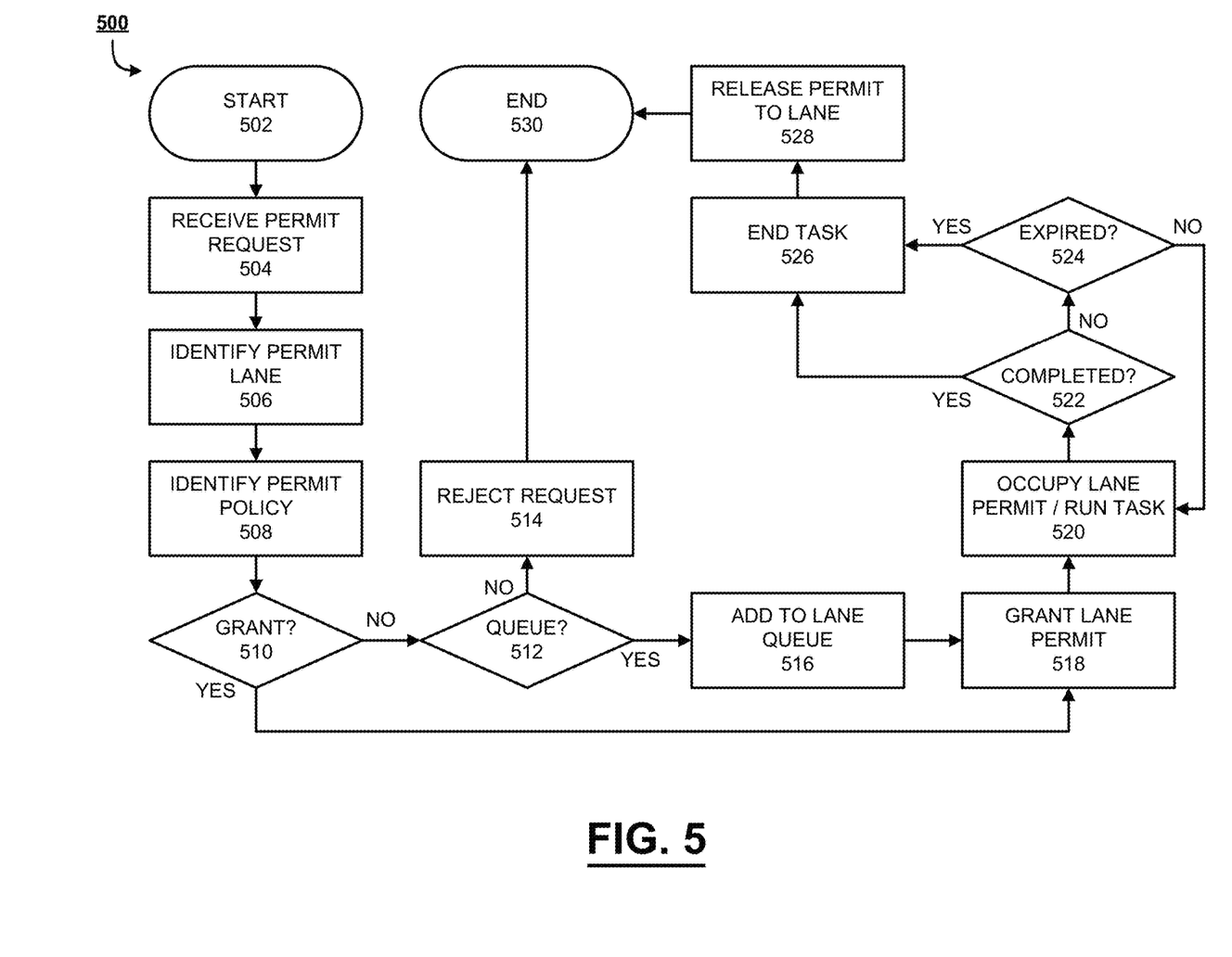
FIG. 5 is a flowchart of an example methodology disclosed herein.

FIG. 5 illustrates an example methodology 500 for throttling one or more requests for resources in accordance with the disclosure. Methodology 500 begins at 502 and proceeds to 504 where a request for a permit is received at an interface from a client. A logical lane associated with the request, which can be based on the client, a resource requested by the client, or other parameters, is identified at 506. Based on the lane (and, in embodiments, other parameters), a policy associated with the request can be identified at 508.

Based on the policy and request, at 510, a determination can be made as to whether the request can be approved by granting a permit from a pool of permits authorizing access to the resource(s) and running of tasks associated therewith. If the determination at 510 returns negative, methodology 500 advances to 512 where a determination is made as to whether the request can be queued (e.g., based on permissible queue length and policy). If the determination at 512 returns negative, methodology 500 proceeds to 514 where the request is rejected, with methodology 500 thereafter ending at 530.

If the determination at 512 returns positive, methodology 500 proceeds to 516 where the request is queued in its respective lane. After reaching the front of the queue, or if the determination at 510 returns positive, a permit is granted for the permit, which can be a permit for its given lane, at 518. Based on release of this permit to the request, methodology 500 advances to 520 where the task associated with the request is run. At 522, a determination is made as to whether the task is complete. If the determination at 522 returns negative, methodology 500 advances to 524 where a determination is made as to whether the permit granted has expired. If the determination at 524 returns negative, methodology 500 returns to 520 where the task continues.

If either determination at 522 or 524 returns positive, methodology 500 advances to 526 where the task ends. Based on the task ending, at 528 the permit associated with the task can be released and destroyed to allow the permit to return to the permit pool to satisfy a subsequent request. After releasing the permit, methodology 500 ends at 530.

Figure 6:
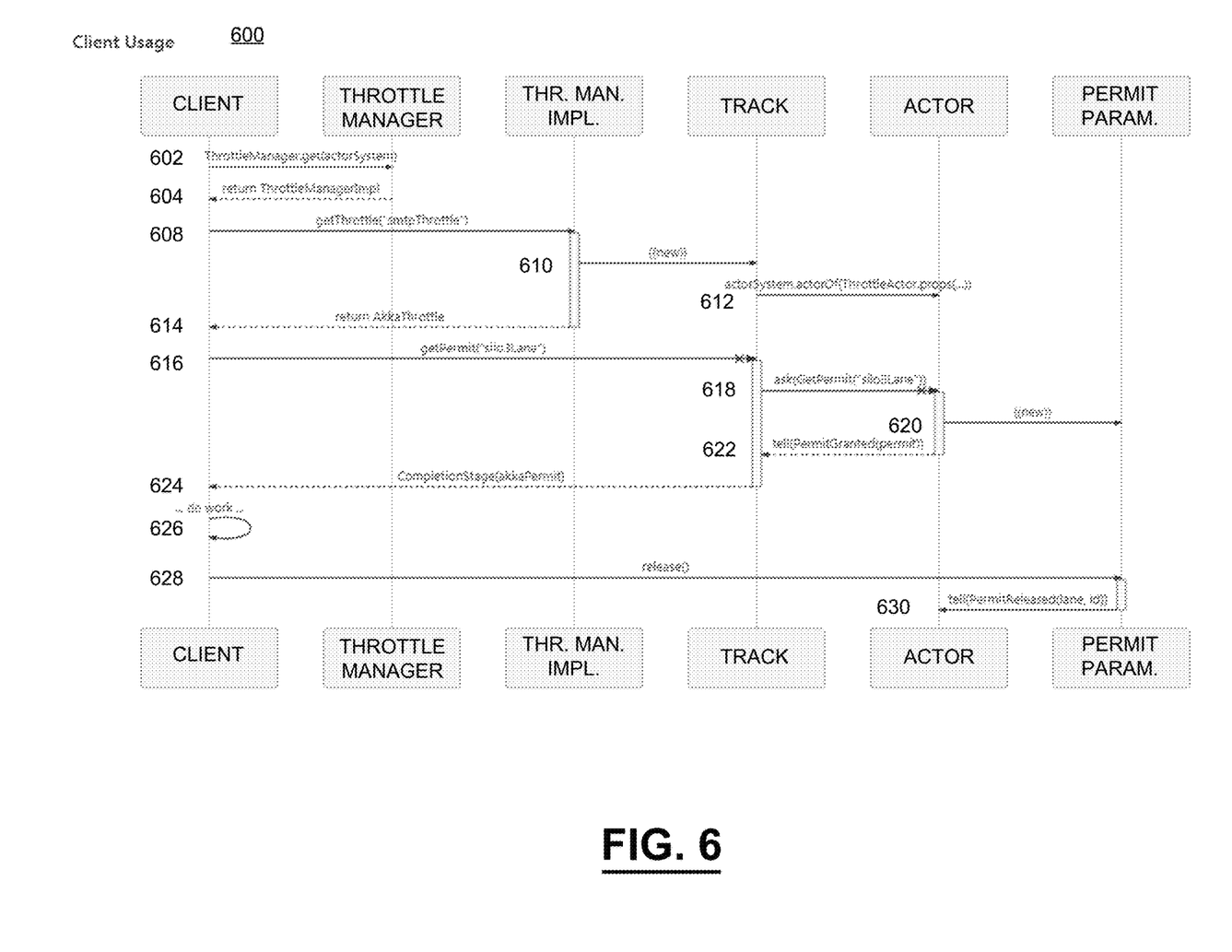
FIG. 6 is a flowchart of an example methodology disclosed herein.

FIG. 6 illustrates a methodology 600 for how a client application interacts with an infrastructure for throttling disclosed herein. At 602, the client requests access to a particular resource. At 604, communication is established with a throttle manager, and at 608 communication is established (directly or through intermediaries) between the client and the throttle governing access to the desired resource. At 610 and 612, modules associated with a throttle can be created to facilitate permit handling (if those modules are not yet instantiated). Based on this setup, at 614, the client permit request can be handled.

At 616, procurement of the permit begins as a tracking module assesses the lane(s) and associated policies. Based thereon, information for confirming the current state and updating the state to a next state including the additional permit satisfying the request can be passed to an actor module. The actor module can then pass the desired state to the permit parameter model at 618, which grants, from the implementation-side (as opposed to the client- or interface-side) the permit by generating a new permit having parameters satisfying the request and observing the relevant policy at 620. This is communicated back to the tracking module at 622, and at 624 the permit release is received back at the client.

At 626, the permit is utilized as the work associated with the request is performed. After completion of the work or expiration of the permit, at 628, release of the permit is communicated to the permit parameter module, which confirms release of the permit, including lane and identifier of the released permit, to the actor module at 630, updating the state following release of the permit associated with the request from the client.

Figure 7A:
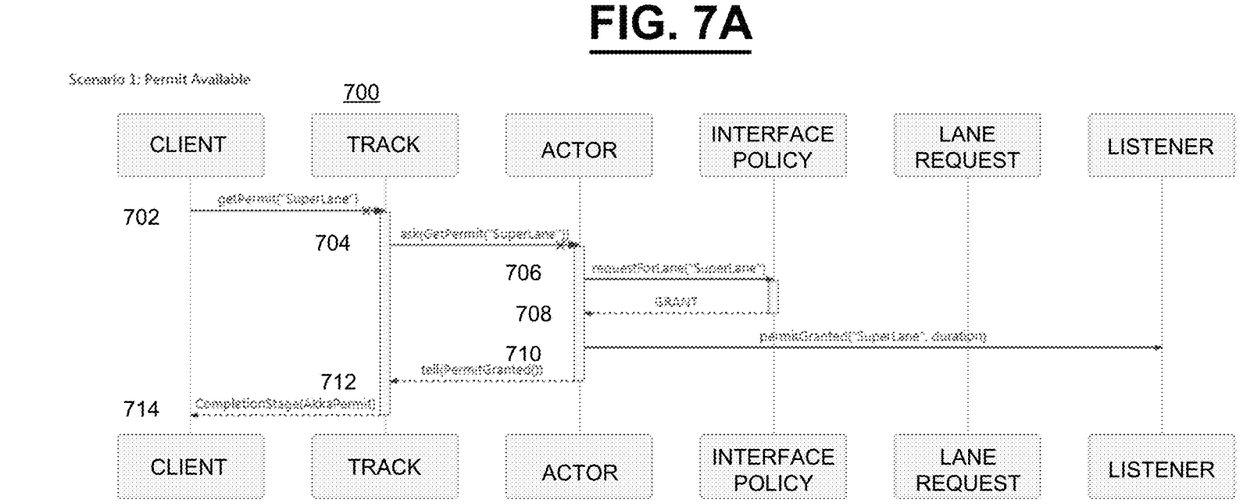
FIG. 7A is a flowchart of an example methodology disclosed herein.
Figure 7B:
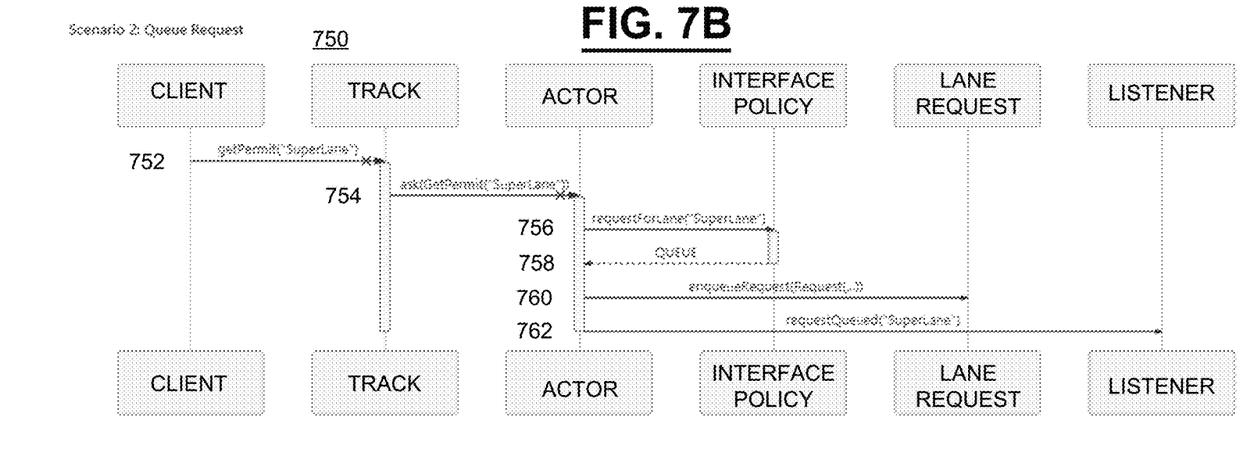
FIG. 7B is a flowchart of an example methodology disclosed herein.
Figure 7C:
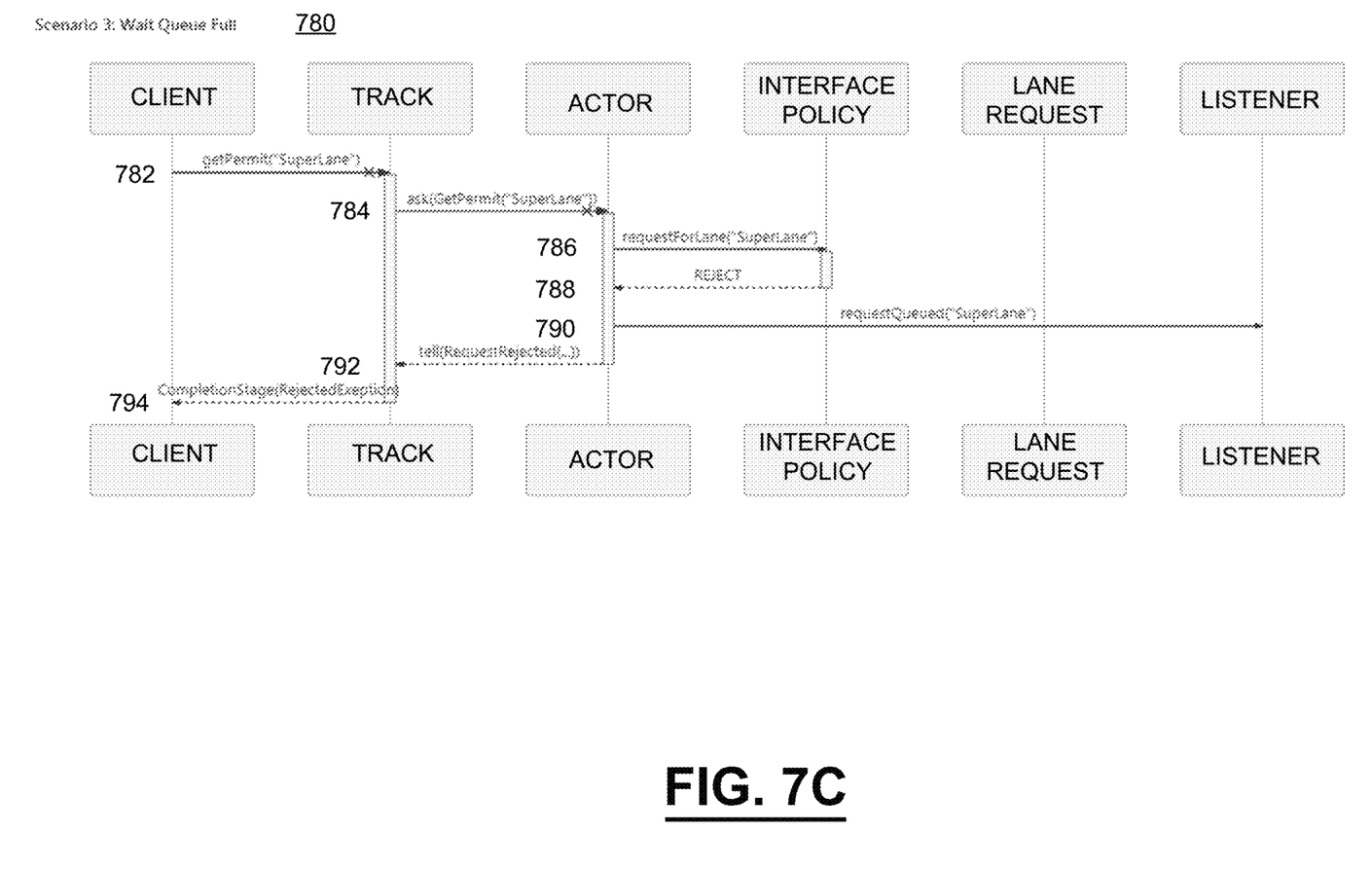
FIG. 7C is a flowchart of an example methodology disclosed herein.

Several variants for permit issuance are discussed herein. FIG. 7A, FIG. 7B, and FIG. 7C illustrate three scenarios for handling requests depending on the availability of permits in view of pool size, policy, traffic, and performance.

FIG. 7A illustrates a methodology 700 for handling a request for a permit when a permit is available. At 702, the client communicates with a tracking module, and at 704 the tracking module communicates with an actor module to continue procurement of the available permit. At 706, the actor module can interact with an interface policy module which assesses the state of the system and its associated resources and policy before leveraging a decision module deciding to grant the permit. This granting is communicated back to the actor module at 708. At 710, a listener module can be informed of the permit grant to ensure the system state is updated throughout, and this can be communicated back to the tracking module at 712. At 714, release of the permit to the client is completed.

FIG. 7B illustrates a methodology 750 for queueing a request when a permit is not immediately available. At 752, the client communicates with the tracking module seeking a permit. At 754 the tracking module interacts with the actor to continue the request, and at 756 this request is provided to the interface policy module, leveraging the decision module, for action. The action at 758 decides to queue the request, with the queuing decision communicated to the actor module. At 760 the actor module passes the instruction to enqueue the request to the lane request module, and at 762 the listener module is informed of the enqueueing to disseminate information for updating the system state including queues. Methodology 750 can thereafter tie into methodology 700 when the request reaches the front of the queue and is to be granted a permit.

FIG. 7C illustrates a methodology 780 for rejecting a request when queues are full. At 782, the client communicates with the tracking module seeking a permit. At 784 the tracking module interacts with the actor to continue the request, and at 786 this request is provided to the interface policy module, leveraging the decision module, for action. The action at 788 decides to reject the request, with the rejection decision communicated to the actor module. At 790 the actor module passes the instruction to reject the request to the listener module to disseminate information for updating the system state including request statuses. The rejection is passed to the tracker at 792, and then onto the client at 794, to inform the client of the rejection and allow later re-request if necessary.

Figure 8A:
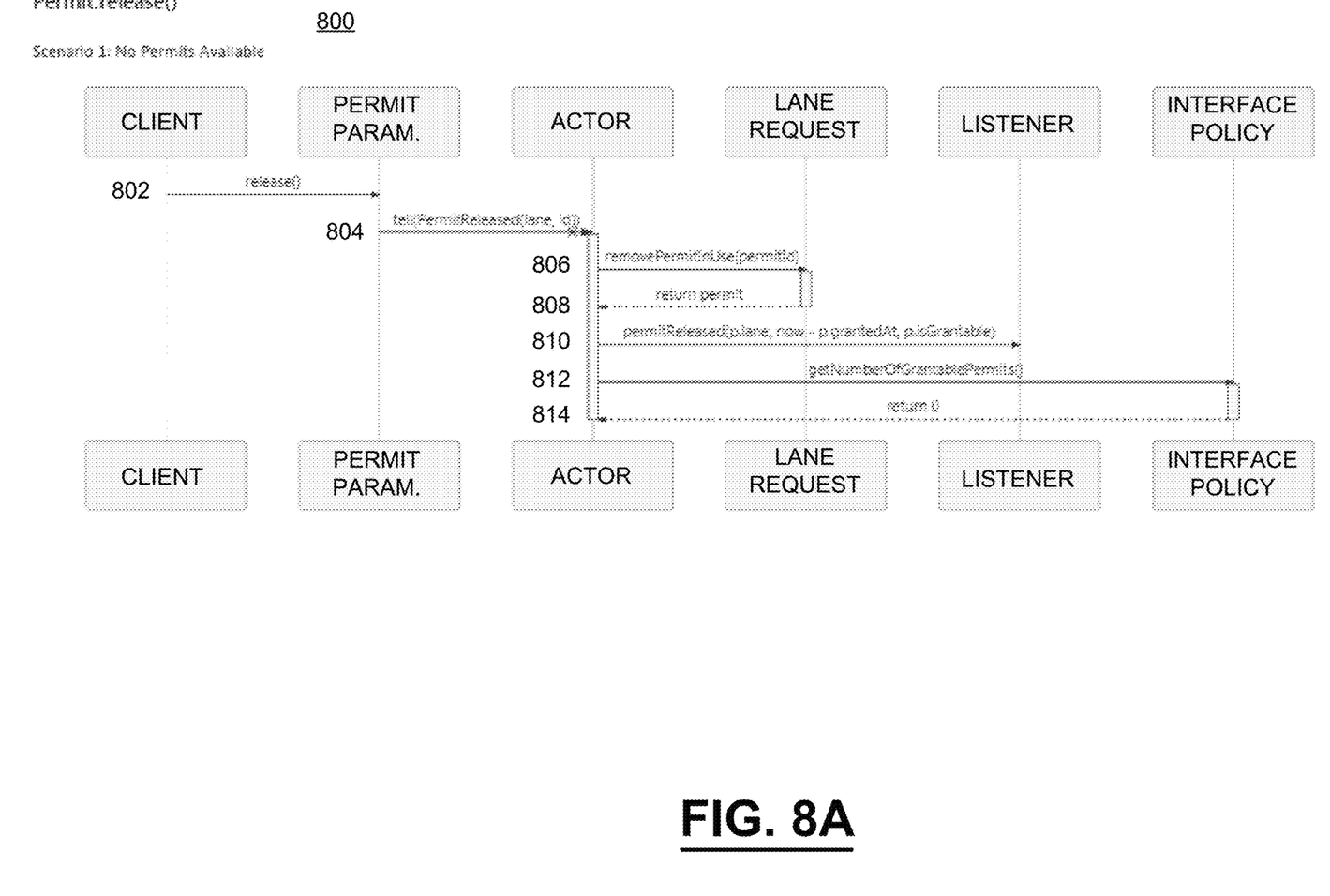
FIG. 8A is a flowchart of an example methodology disclosed herein.
Figure 8B:
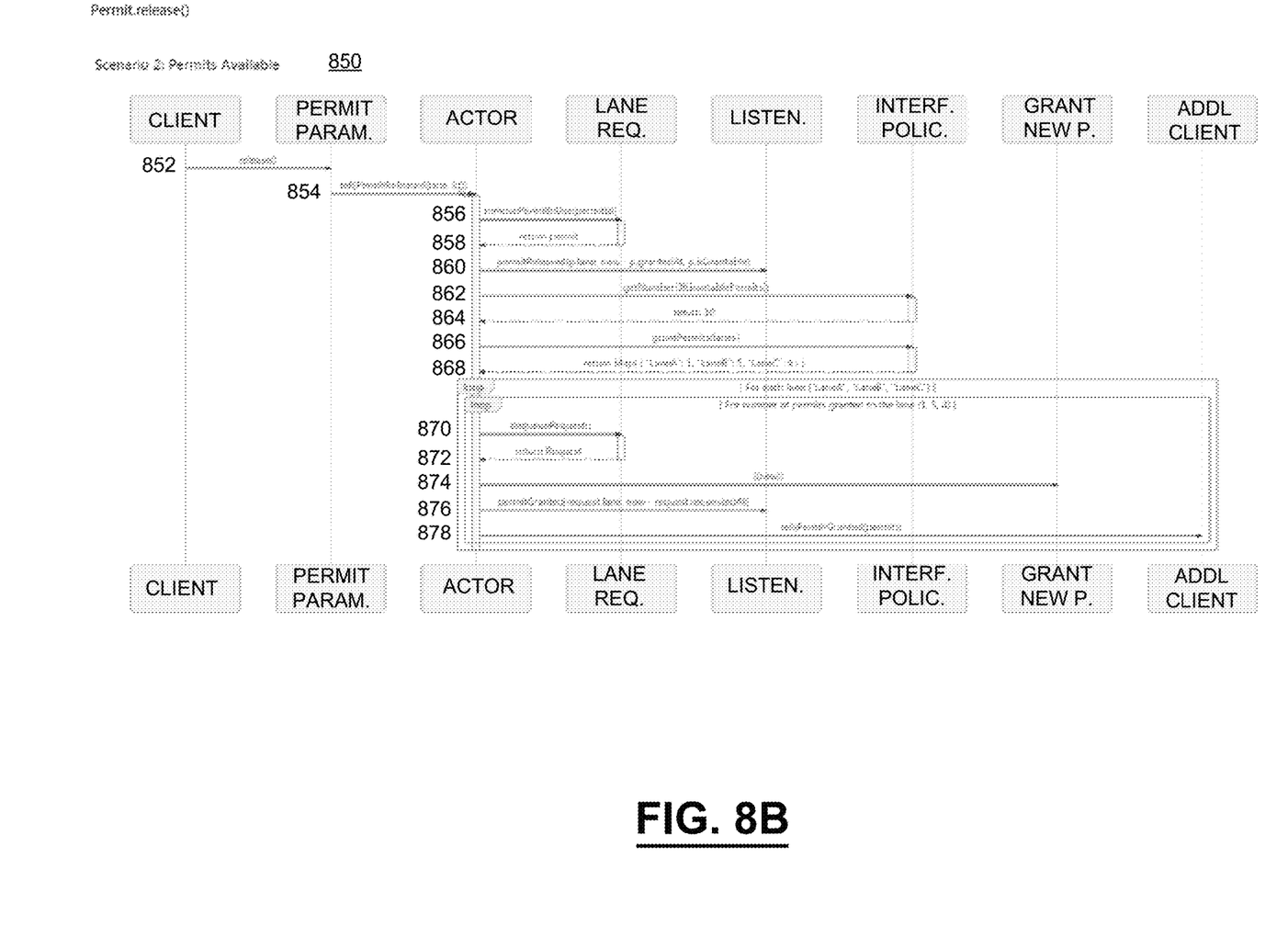
FIG. 8B is a flowchart of an example methodology disclosed herein.

FIG. 8A and FIG. 8B illustrate methodologies for releasing permits from a client back to the permit pool, after job completion or permit expiration, depending on their availability. FIG. 8A illustrates methodology 800 for permit release when no permits are available. At 802 the client indicates the permit is to be released, and the permit parameter module indicates to the actor module at 804 that an identified permit from a given lane is being released. At 806, the actor module passes this release to the lane request module, which returns a response approving release of the permit at 808. The actor module at 810 indicates to the listener of the permit released, including its lane, time of release, and status as grantable. At 812, the actor updates its own state by determining a number of grantable permits from the interface policy module, which returns its response at 814.

FIG. 8B illustrates a methodology 850 for releasing a permit when permits are available. At 852 the client indicates to the permit parameter module that the permit is being released, and at 854 the permit parameter module indicates to the actor module that the permit is released, including the permit's identifier and lane information. At 856, the actor module communicates to the lane request module to remove the permit in use, and after lane request module returns confirmation at 858, the actor module indicates the permit released to the listener at 860. At 862, the actor module queries the number of grantable permits from the interface policy module, and after receiving a response at 864 indicates permits to be granted for particular lanes at 866. At 868 the interface policy module returns a lane map including lanes and associated policies.

Thereafter, a loop of communications is performed for each lane and for the number of permits granted to each lane (e.g., based on the policy governing each lane). The loop begins with the actor module communicating with the lane request module to dequeue queued requests at 870 and the lane request module responding at 872. Thereafter, at 874, the actor module issues a command to grant a new permit to the dequeued request, and at 876 the actor module indicates the dequeued request granted a permit to the listener. Thereafter, at 878, a client associated with the recently dequeued request can be informed that its permit is granted and proceed to perform the associated work using the requested resource.

While systems and methodologies are implemented in a variety of fashions and explained at times by example, it is understood that any aspect from any system or method can be practiced in another system or method disclosed herein without departing from the scope or spirit of the innovation. Moreover, aspects herein can be implemented as systems, methods, computer programs, software, coded instructions, routines, et cetera, and can be stored on various media including at least a non-transitory computer-readable medium, and can be executed by a processor and communicated over networks or through various electronic components.

The systems, methods and computer program products disclosed in conjunction with various aspects of the present disclosure are embodied in systems and methods for facilitating multiple types of communications in systems and networks discussed herein.

Methodologies herein are described with specific aspects for ease of explanation with respect to various embodiments. However, methodologies embraced under the scope and spirit of the disclosure may vary, to include excluding particular aspects or comparisons described.

Moreover, while aspects herein are described singularly, such as clients or permits, it is understood that a plurality of such can and are intended to be managed simultaneously by aspects of the disclosure, and reference in the singular is only provided at particular places within the disclosure for ease of explanation.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A system, comprising:
   a policy subsystem configured to define a throttling policy based on traffic for each of a plurality of logical lanes associated with a resource;
   an interface subsystem configured to receive a request from a client to access the resource, wherein the client accesses the resource through multiple ones of the plurality of logical lanes, each of the plurality of logical lanes configured to accept requests from different classes of clients including the client such that different service requests are allocated to different lanes based on the service type of the service request in accordance with the class of client associated with the service, wherein the interface subsystem is configured to monitor a state of one or more requests to access the resource, wherein the state includes a number of queued requests for each of one or more of the plurality of logical lanes associated with the one or more requests, and wherein the one or more requests includes the request; and an implementation subsystem configured to throttle traffic from the client to the resource based on the throttling policy, wherein the throttling policy controls at least one permit issued to the client for the multiple ones of the plurality of logical lanes based on the state of the one or more requests to access the resource and queue limits associated with the plurality of logical lanes.

2. The system of claim 1, comprising:
a permit request module of the interface subsystem configured to receive the permit request from the client; and
a permit issuance module of the interface subsystem configured to release the permit to the client,
wherein the permit request interface is configured to provide a permit reservation to the client, and wherein the permit corresponds to the permit reservation.

3. The system of claim 1, comprising:
a dynamic module of the policy subsystem configured to manage permits according to an algorithm;
a static module of the policy subsystem configured to manage permits according to a fixed pool; and
an unlimited module of the policy subsystem configured to manage permits matching demand.

4. The system of claim 1, comprising:
an actor module of the implementation subsystem configured to communicate with an interface request module to determine disposition of the permit request by the implementation subsystem.

5. The system of claim 4, comprising:
a permit parameter module of the implementation subsystem, wherein the permit parameter module of the implementation subsystem grants a permit with the parameters specified by a permit policy based on determination that the implementation subsystem is granting the permit.

6. The system of claim 4, comprising:
a lane request module of the implementation subsystem configured to add the request to a queue of one of the plurality of logical lanes based on determination that the implementation subsystem is queuing the request.

7. The system of claim 6, wherein the actor module communicates release of a previous permit to the lane request module, wherein the release causes dequeuing of the request from the one of the plurality of logical lanes.

8. The system of claim 1, an application programming interface (API) configured to communicate with a legacy resource, wherein the resource is the legacy resource.

9. The system of claim 1, wherein each of the plurality of logical lanes has a lane priority in relation to another of the plurality of logical lanes.

10. The system of claim 1, wherein permit has a permit expiration time.

11. The system of claim 1, wherein the permit is granted from a permit pool, and wherein the permit pool comprises dedicated permits, shared permits, and unrestricted permits.

12. A method, comprising:
defining a throttling policy based on traffic for each of a plurality of logical lanes associated with a resource, each of the plurality of logical lanes configured to accept requests from different classes of clients including the client such that different service requests are allocated to different lanes based on the service type of the service request in accordance with the class of client associated with the service;
monitoring a state of one or more requests to access the resource, wherein the state includes a number of queued requests for each of one or more of the plurality of logical lanes associated with the one or more requests;
receiving a request from a client to run a task utilizing a network resource, wherein the client accesses the resource to run the task through multiple ones of the plurality of logical lanes, wherein the request is one of the one or more requests; and
throttling traffic from the client to the resource based on the throttling policy, wherein the throttling policy controls at least one permit issued to the client for the multiple ones of the plurality of logical lanes based on the state of the one or more requests to access the resource and queue limits associated with the plurality of logical lanes.

13. The method of claim 12, comprising:
queuing the request from the client until satisfaction of a condition, wherein the request is queued with other requests in the lane.

14. The method of claim 12, comprising:
determining an expected response time associated with a permit pool associated with the one of the plurality of logical lanes;
determining one or more actual response times associated with one or more preexisting permits granted from the one of the plurality of logical lanes;
comparing the one or more actual response times to the expected response time; and
increasing a number of permits associated with the one of the plurality of logical lanes in the permit pool.

15. The method of claim 12, comprising:
determining that the task utilizing the network resource is complete;
if the task is not complete, determining when the permit expires before completion of the task utilizing the network resource; and
releasing the permit based on expiration or completion.

16. A computer program product stored on a non-transitory computer-readable medium containing instructions that when executed by a processor effectuate operations comprising:
defining a throttling policy based on traffic for each of a plurality of logical lanes associated with a resource, each of the plurality of logical lanes configured to accept requests from different classes of clients including the client such that different service requests are allocated to different lanes based on the service type of the service request in accordance with the class of client associated with the service;
monitoring a state of one or more requests to access the resource, wherein the state includes a number of queued requests for each of one or more of the plurality of logical lanes associated with the one or more requests;

receiving a request from a client to run a task utilizing a network resource, wherein the client accesses the resource to run the task through multiple ones of the plurality of logical lanes, wherein the request is one of the one or more requests; and throttling traffic from the client to the resource based on the throttling policy, wherein the throttling policy controls at least one permit issued to the client for the multiple of the plurality of logical lanes based on the state of the one or more requests to access the resource and queue limits associated with the plurality of logical lanes.

17. The computer program product of claim 16, wherein the instructions, when executed by the processor, effectuate operations comprising:

providing a permit reservation to the client, wherein the permit corresponds to the permit reservation.

18. The computer program product of claim 17, wherein the throttling policy is dynamic and governed according to an algorithm.

19. The computer program product of claim 17, wherein the instructions, when executed by the processor, effectuate operations comprising:

determining a disposition of the permit request.

20. The computer program product of claim 17, wherein the resource is a legacy resource accessed through an application programming interface (API).

* * * * *